United States Patent
Anderson et al.

(10) Patent No.: US 12,068,877 B2
(45) Date of Patent: Aug. 20, 2024

(54) MASS-NOTIFICATION SYSTEM AND METHOD

(71) Applicants: Scott Anderson, Winston Salem, NC (US); William Becker, St. Paul, MN (US); Britney Aronson, Philadelphia, PA (US)

(72) Inventors: Scott Anderson, Winston Salem, NC (US); William Becker, St. Paul, MN (US); Britney Aronson, Philadelphia, PA (US)

(*) Notice: Subject to any disclaimer, the term of this patent is extended or adjusted under 35 U.S.C. 154(b) by 0 days.

(21) Appl. No.: 17/503,114

(22) Filed: Oct. 15, 2021

(65) Prior Publication Data

US 2022/0150086 A1  May 12, 2022

Related U.S. Application Data

(60) Provisional application No. 63/092,316, filed on Oct. 15, 2020.

(51) Int. Cl.
*H04L 12/18* (2006.01)

(52) U.S. Cl.
CPC ...... *H04L 12/1859* (2013.01); *H04L 12/1895* (2013.01)

(58) Field of Classification Search
CPC .................. H04L 12/1859; H04L 12/1895
See application file for complete search history.

(56) References Cited

U.S. PATENT DOCUMENTS

| 7,519,165 B1 | 4/2009 | Rodkey et al. | |
| 11,315,408 B1* | 4/2022 | Nelson ................ | G07C 9/20 |
| 2014/0376410 A1* | 12/2014 | Ros ........................ | H04M 11/04 370/259 |
| 2015/0269700 A1* | 9/2015 | Miasnik ................ | G06Q 10/00 705/325 |
| 2015/0379861 A1* | 12/2015 | DeMara, II ............ | G08B 25/08 340/539.13 |
| 2016/0277892 A1* | 9/2016 | Walker .................... | G08B 25/08 |
| 2019/0073896 A1* | 3/2019 | Pinckney-Maas .......................... | H04M 1/72457 |

FOREIGN PATENT DOCUMENTS

| KR | 20190078673 A | 7/2019 |
| WO | 2017103321 A1 | 6/2017 |
| WO | 2019141593 A1 | 7/2019 |

OTHER PUBLICATIONS

International Search Report and Written Opinion of the International Searching Authority, mailed Feb. 3, 2022, for International Application No. PCT/US2021/055303, 13 pages.
Muruts, "Mutli-Tenant Apache Kafka for Hops", Masters of Science Thesis, Software Engineering of Distributed Systems, Stockholm, Sweden, Nov. 15, 2016, 70 pages.

* cited by examiner

*Primary Examiner* — Farzana B Huq
(74) *Attorney, Agent, or Firm* — Cozen O'Connor

(57) ABSTRACT

System and method for initiating mass notification events. The notification events may include unidirectional or bidirectional messaging to a plurality of recipients. Events are provisioned to include a set of recipients and a message to be delivered to those recipients. The events are provided to a set of topic channels. Individual ones of communication method handlers are caused to subscribe to one or more of the topic channels.

5 Claims, 14 Drawing Sheets

```
{                                          {
  "exampleRecipients": [                      "name": "recipient c",
    {                                         ...
      "name": "recipient a",                  "properties": [
      ...                                       {
      "properties": [                             "label": "dept",
        {                                         "value": "HR"
          "label": "dept",                      },
          "value": "HR"                         {
        },                                        "label": "zipcode",
        {                                         "value": "55115"
          "label": "zipcode",                   }
          "value": "55116"                    ]
        }                                   },
      ]                                     {
    },                                        "name": "recipient d",
    {                                         ...
      "name": "recipient b",                  "properties": [
      ...                                       {
      "properties": [                             "label": "dept",
        {                                         "value": "development"
          "label": "dept",                      },
          "value": "development"                {
        },                                        "label": "zipcode",
        {                                         "value": "55116"
          "label": "zipcode",                   }
          "value": "55115"                    ]
        }                                   }
      ]                                   }
    },
```

FIG. 2

```
CREATE TABLE suppressed_address (
suppressed_address_id  VARCHAR NOT NULL
-- [jooq ignore start]
DEFAULT gen_random_uuid()::varchar
-- [jooq ignore stop]
,
created_date    TIMESTAMP DEFAULT CURRENT_TIMESTAMP,
type     VARCHAR,
cleaned_address VARCHAR NOT NULL, reason    VARCHAR,
source  VARCHAR,
tenant_id        VARCHAR, -- NO FK PRIMARY KEY (suppressed_address_id)
);
CREATE TABLE suppressed_address_history (
suppressed_address_history_id VARCHAR       NOT NULL
-- [jooq ignore start]
DEFAULT gen_random_uuid()::varchar
-- [jooq ignore stop]
,
cleared_date    TIMESTAMP DEFAULT CURRENT_TIMESTAMP,
cleared_reason  VARCHAR,
cleared_source  VARCHAR,
--      following data should be copied from original suppressed_address record
created_date    TIMESTAMP NOT NULL,
type    VARCHAR,
cleaned_address           VARCHAR        NOT NULL, reason         VARCHAR,
source  VARCHAR,
tenant_id        VARCHAR, -- NO FK PRIMARY KEY (suppressed_address_history_id)
 );
```

*FIG. 6*

MASS-NOTIFICATION SYSTEM AND METHOD

PRIOR APPLICATION

This Application claims the benefit of U.S. Provisional Application No. 63/092,316 filed Oct. 15, 2020, and which is incorporated by reference into the present disclosure in its entirety.

TECHNICAL FIELD

The present subject matter relates generally to information communications and, more particularly, to systems and methods for preparing and executing communication events to a plurality of recipients.

BACKGROUND

A mass-notification system, sometimes referred to as an emergency communication system, is an information-communication system for effecting one-way and two-way communication of important information (e.g., emergency information, alerts, or other notifications) between individual senders and large groups of recipients of such information. Such systems are generally designed and built to send the information over multiple modalities, e.g., email, telephone, SMS or other messaging service, push notifications, or the like, at the same time.

Mass-notification systems may be deployed in a variety of settings and for different purposes. Although traditional applications focus on providing rapid and wide-scale emergency alerts, myriad other applications are contemplated, such as disseminating announcements in large or distributed organizations or affiliations (e.g., governments, large companies, buildings or campuses, municipalities, neighborhoods, or the like).

A variety of challenges arise in practice when designing or deploying a mass-notification system. For instance, recipients who use multiple modes of communication may receive duplicate notifications from a mass-notification system, leading to their dissatisfaction and potentially opting out of receiving notifications.

As another challenge, large or widespread events may cause the system to produce huge amounts of messages in queue to be processed for a particular contact method (e.g., SMS) and provider (e.g., Twilio). During this time, if, another event creates a call for further notifications, those newer messages would conventionally be placed behind the previously queued messages. Situations like this may be handled using priority numbering, in which some messages are assigned a higher priority to indicate those messages should be deliver first. However, in practice, an approach such as this may still fall short of addressing the problem, as priority may sometimes be meaningless in the absence of proper context.

Solutions to these, and other, challenges in practical mass-notification systems are needed.

SUMMARY OF THE DISCLOSURE

Aspects of this disclosure are directed to providing automated notifications to recipients, which may be organized in groups. The system and method described herein has wide applicability in large and small organizations alike, and throughout industry, government, healthcare, public-address, military, education, entertainment, and other sectors.

For instance, in a corporate context, a mass notification system or method according to various embodiments may be used to communicate critical information to employees. Marketing organizations may employ a mass notification system or method to advertise to customers or subscribers. The system or method may be used to communicate time-critical or essential information, such as emergency mass notifications to the public, to first responders, or as targeted operational communications to select individuals. In addition, the system or method may be used to ensure reliable delivery of notifications.

The groups of recipients may contain large pluralities of recipients (on the order of tens of thousands, hundreds of thousands, or more), or may be much smaller sets (e.g., several tens of recipients). A recipient is generally an entity, such as an individual person, an organization, an account, a specific device or set of devices, for instance. Each recipient has one or more communication facilities, such as a telephone number, email address, messaging address or account, or the like, which can receive messages and, in some instances, can engage in bidirectional communications (e.g., an ability to acknowledge receipt of a message).

The mass notification system may be hosted or otherwise deployed for use by multiple distinct senders of messages, which are referred to herein as tenants. Tenants have their own user or administrator accounts and corresponding data. Each tenant may be associated with its own group(s) of recipients, contact methods, rules for addressing and sending messages, messaging templates, and messaging service provider account(s). Usage of the system by tenants may be quantified and billed according to prearranged billing criteria that may be tenant-specific.

A specific instance of communication with a group of recipients is referred to herein as an event. An event may include unidirectional or bidirectional messaging. Tenants may initiate events, with each event corresponding to a message format, specific message content, a group of recipients, one or more modes of communication to be used (optionally including a hierarchical order of preference), criteria for re-sending failed messages, criteria for varying the mode of communication for subsequent communication attempts, criteria for suppressing communications to specified contact methods, criteria for suppressing communications in response to certain conditions, criteria for avoiding duplication of communications to recipients, or other relevant parameters that may be predefined or specified in an ad-hoc manner at the time of event initiation. Thus, according to various examples detailed below, the system or method enables tenants to initiate events to groups of recipients across many different contact methods and to receive acknowledgment status messages indicating whether messages were received or to identify what type of replies are received.

One aspect of the disclosure is directed to a method for initiating mass notification events in a system, said events comprising bidirectional messaging to a plurality of groups of recipients via different contact methods to provide mass notifications and for receiving acknowledgment status messages, the method comprising: obtaining a security token from a provider to initiate authentication to the system; accessing the system to create intercommunicating entities that receive the bidirectional messages; receiving a request from an entity to send notifications to the plurality of groups of recipients; accessing a suppression database to determine whether any recipient is within the suppression database;

transmitting the notifications to the plurality of groups of recipients that are not located within the suppression database.

Another aspect is directed to an apparatus for initiating mass notification events in a system, said events comprising bidirectional messaging to a plurality of groups of recipients via different contact methods to provide mass notifications and for receiving acknowledgment status messages, the apparatus comprising: a processor; and memory; wherein the processor is configured to: obtain a security token from a provider to initiate authentication to the system; access a system to create intercommunicating entities that receive bidirectional messages; receive a request from an entity to send notification to the plurality of groups of recipients; access a suppression database to determine whether any recipient is within the suppression database; and transmit the notifications to the plurality of groups of recipients that are not located within the suppression database.

Another aspect is directed to a method for disseminating messages from a first tenant to a plurality of recipients. The method includes: generating a first event data structure that includes, a first message and a first set of recipients for the first message; placing the first event data structure on a first topic channel data structure of a plurality of topic channel data structures; generating a second event data structure that includes a second message and a second set of recipients for the second message; placing the second event data structure on a second topic channel data structure of the plurality of topic channel data structures; causing a first contact method handler of a set of automated contact method handlers to subscribe to the first topic channel and to the second topic channel; causing a second contact method handler of the set of contact method handlers to subscribe to the second topic channel; by the first contact method handler, reading the first event data structure from the first topic channel, and formatting a first message for transmission to a first mass-communications service provider to notify a first portion of the first set of recipients by a first mode of communication; by the first contact method handler, reading the second event data structure from the second topic channel, and formatting a second message for transmission to the first mass-communications service provider to notify a second portion of the second set of recipients by the first mode of communication; and by the second contact method handler, reading the second event data structure from the second topic channel, and formatting a third message for transmission to a second mass-communications service provider to notify a third portion of the second set of recipients by a second mode of communication that is different from the first mode of communication.

BRIEF DESCRIPTION OF THE DRAWINGS

The invention may be more completely understood in consideration of the following detailed description of various embodiments of the invention in connection with the accompanying drawings, in which:

FIG. 2 is a portion of code that defines various properties of recipients, as may be used in the system of FIG. 1 according to an illustrative example.

FIG. 6 shows program instructions as an example of a technique for leaving an audit trail according to an illustrative embodiment.

Figure 1A:
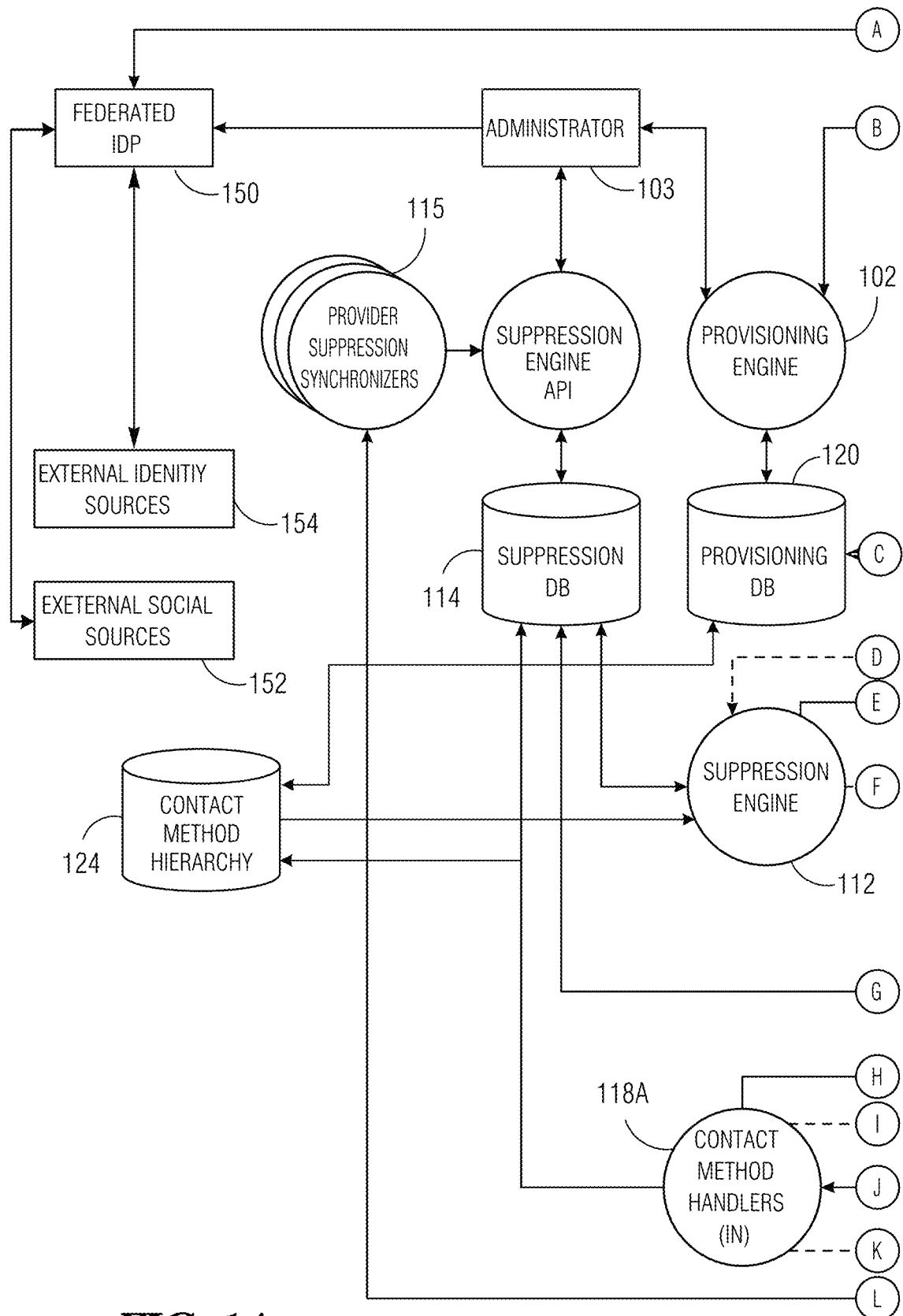
FIGS. 1A-1C (collectively, FIG. 1) is a block diagram illustrating a system architecture of an example mass-notification system according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DESCRIPTION OF THE PREFERRED EMBODIMENTS

Aspects of the present invention may be implemented as part of a computer system. The computer system may be one physical machine, or may be distributed among multiple physical machines, such as by role or function, or by process thread in the case of a cloud computing distributed model. In various embodiments, aspects of the invention may be configured to run in virtual machines that in turn are executed on one or more physical machines. It will be understood by persons of skill in the art that features of the invention may be realized by a variety of different suitable machine implementations.

Figure 1B:
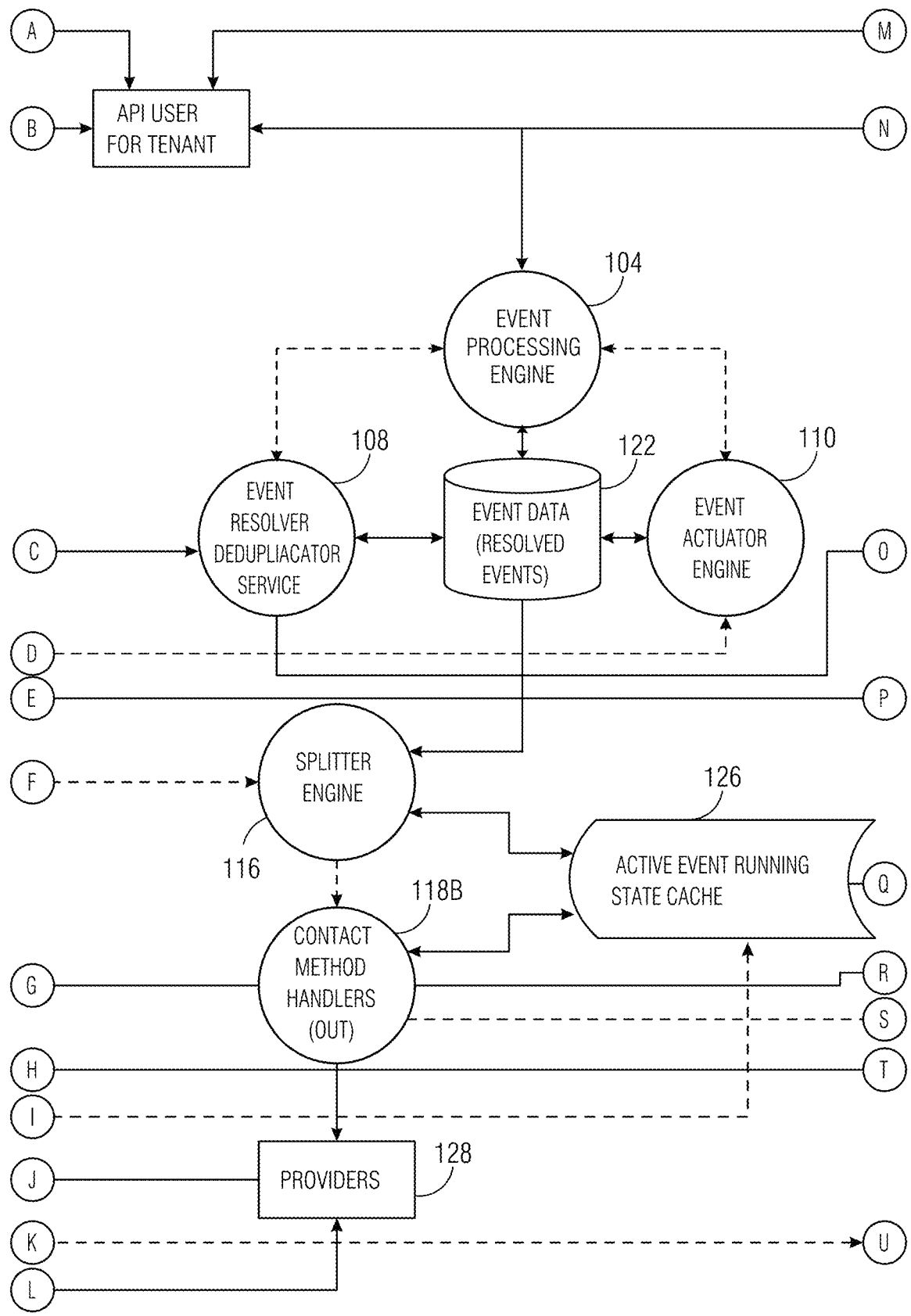
Figure 1C:
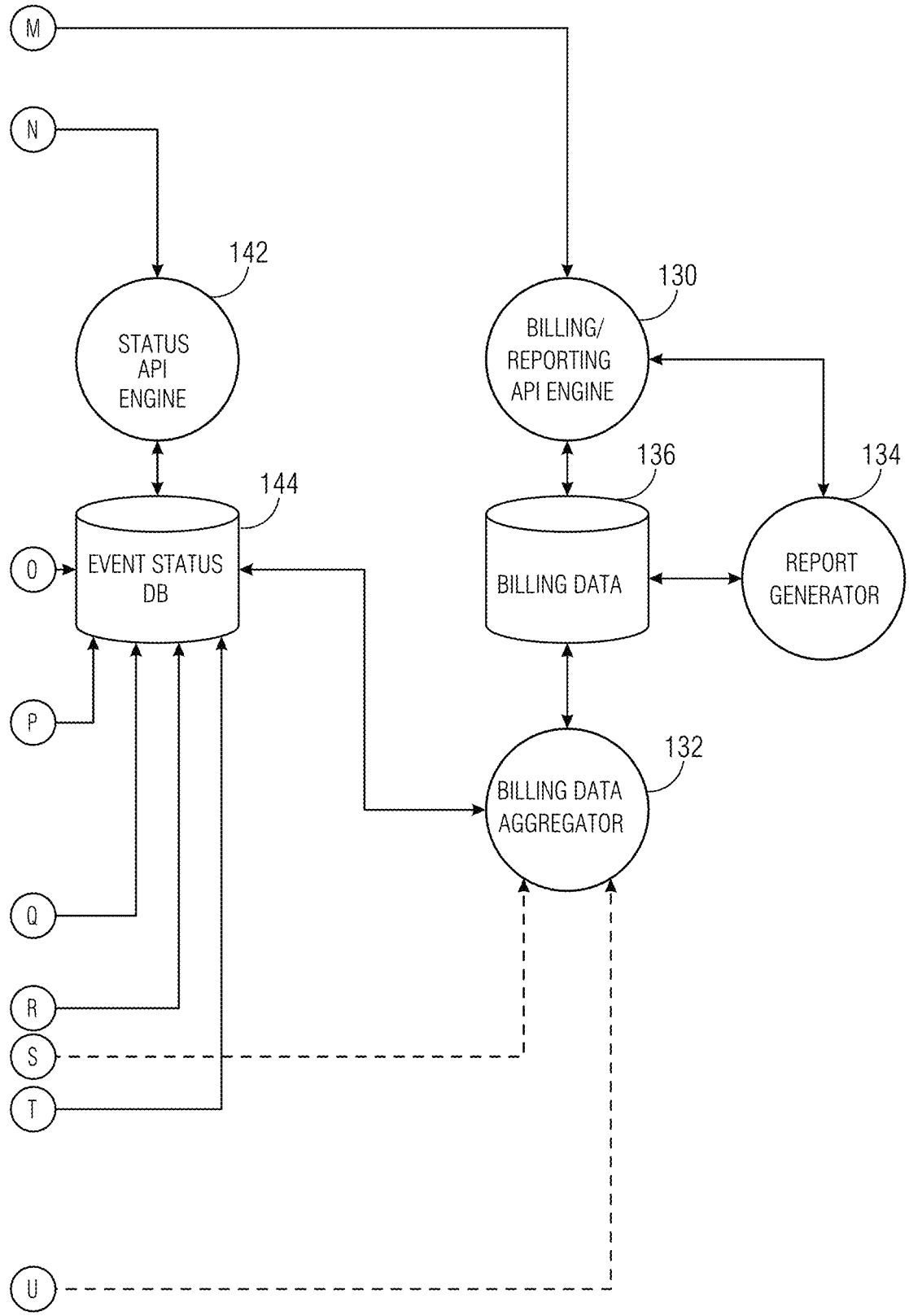

As discussed above, aspects of the invention are directed to a mass-notification system and associated methods of operation. According to some embodiments, the mass-notification system is built as a set of engines, as depicted in FIGS. 1A-1C (collectively, FIG. 1).

The system includes various engines, each of which is constructed, programmed, configured, or otherwise adapted, to carry out a function or set of functions, as detailed below. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

In examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

According to some example implementations, the system includes three primary engines that facilitate user or administrator interactivity with the system. These are the provisioning engine 102, the event processing engine 104, and the status engine 106. These engines may be implemented with separate endpoints and operate independently from one another; or, in other implementations, the engines may be at least partially integrated on one or more shared or distributed computing platforms. In some implementations, these engines may be implemented as application programming interfaces (APIs) executing on computing hardware. These APIs may be accessible over a computer network such as the Internet as a cloud-computing model or software-as-a-service (SAAS) model. In related implementations, some engines may be implemented as services, as handlers, or as other types of program components, running on computing hardware. In the following description, the terms "engine," "API," "service," "handler" may be used interchangeably unless a specific distinction or meaning is specifically called out.

The functionality of the provisioning engine 102 primarily involves managing data before any event processing, including alerting, takes place. Provisioning operations include billing, establishing tenant-level preferences and policies, managing contacts, event templates, and the like. A tenant is an entity that utilizes or controls the mass-notification engine, and may be one of multiple authorized users of the system.

The event processing engine 104 carries out events, such as alerts. Event processing operations may include resolving events (e.g., suppressing certain actions from affecting recipients, or removing duplicative actions from being carried out), and starting or cancelling the execution of events.

The status engine 106 involves reporting the results of an event during and after its execution.

According to related embodiments, any major object in the system allows arbitrary key-value pairs, referred to as properties, to be attached by the system through an API. This may include recipients, recipient modes, event templates, groups, and tenants.

Notably, a mass-notification system that is tasked with processing events to notify large groups of recipients, e.g., tens of thousands, or perhaps hundreds of thousands, of recipients, utilizes substantial computing resources and communication resources. Access to such resources may be quite costly to a tenant, and may occupy the working capacity of the mass-notification system, thus preventing or limiting its availability to other tenants or for other event processing by the same tenant. As will be described in greater detail below, various aspects of the embodiments are provided to reduce the resource utilization. In some embodiments, a suppression engine 112 and a de-duplicator engine 108 each facilitates resolving events to limit recipients, and to limit the type(s) of notification to be provided. In related embodiments, a multiplexing service may be provided to operate the system in a way that permits multiple events to be processed for the same or a different tenant before completion of a prior event.

FIG. 1 is a block diagram illustrating a system architecture of an example mass-notification system according to an embodiment. In FIG. 1, various engines, which may be implemented as APIs, services, handlers, and other engine types, are represented using round blocks. Rectangular blocks depict various entities, such as third-party service providers, users, administrators, or the like. Cylindrical blocks and the bullet-shaped block represent data stores, such as data structures, data in memory, in a file system, or on a server, or databases, etc.

Provisioning

The provisioning engine 102 facilitates creation of entity objects (e.g., within the engine's API) that represent people or machines that will communicate. In accordance with an example, the provisioning engine 102 operates to accept user input to compile a database of managed recipients with information such as names, lists of the recipients' phone numbers, email addresses, messaging service addresses, and any other coordinates at which the recipients may be contacted.

In order to create a set of recipients, those recipients are associated with a tenant within the system. There are two types of recipients in the system. The first type of recipient is an ad-hoc recipient, which does not already exist within the existing recipient database(s) and is entered through the provisioning engine 102 in conjunction with setting up an event. This first type of recipient may include a list of contact methods (with address, phone number, country code and any associated properties).

The second type of recipient is a managed recipient, the set of which is created in the system and saved to a database prior to any event being created. These managed recipient records include details such as contact method information, location data and personal information, such as first and last name. These managed recipients can be saved, removed and edited within the system, without being explicitly being associated with any type of event.

In accordance with one aspect of this disclosure, groups are created and managed via the provisioning engine 102. Groups have their own unique properties and may be associated with an existing tenant. A group can have an unlimited number of associated managed recipients, which is maintained via a recipient group map or other suitable data structure.

Managed recipients can be added and removed from a group. In some implementations, deleting a group will never delete recipient records but, instead, such a deletion will result in the deletion of records from the recipient group map. A deleted recipient record can also cascade to the recipient group map, resulting in the removal of a managed recipient from a group if the recipient record is deleted.

The repositories of managed recipients store contact information about those recipients to be incorporated into the events. These repositories hold recipients and their attributes, their contact modes, groups, dynamic group definitions, and event templates. The data for the managed recipients may be maintained by the provisioning engine 102.

Every recipient has a set of zero or more properties. In one implementation, the recipient's properties are simple key value pairs, e.g., a label, and an associated value. These key value pairs are arbitrary and can be defined by end users to meet the needs of the end users' applications.

A group of recipients may also be dynamic in some embodiments. A dynamic group has one or more key value pairs that would match or not match some group of zero or more recipients. These groups may be determined at the time when the event template is resolved.

As an example of a use case, the user may input an event template payload that includes contact information and a set of properties for each recipient associated with that event. FIG. 2 is a portion of code that defines various properties of recipients according to an illustrative example. Accordingly, based on the properties selected for this event—the may choose to contact specific people who match those properties. For example:
 If the user chooses to contact all recipients within the "development" department, the system would pull recipient B and recipient D;
 If the user chooses to contact all recipients living in zipcode "55116", the system would pull recipient A and recipient D;
 If the user chooses to contact all recipients within the "HR" department, the system would pull recipient A and recipient C;
 If the user chooses to contact all recipients living in zipcode "55115", the system would pull recipient B and recipient C.

These properties can be expanded to any number and can be any set of labels or values, as needed, to define the various groupings.

In addition, the provisioning engine 102 may facilitate establishment of tenants in the system. Accordingly, the "from" address for sending emails or other messaging types may be specified. There are instances in which certain users may not wish to send certain message types or voice phone calls. Their intention may be to only send limited types of messages, such as SMS or email. As a tenant/administrator 103, the user can make these types of configuration settings via the provisioning engine 102. That is, the tenant/administrator can configure parameters of the tenant, as well as any associated sub-tenants.

Thus, in various embodiments, the provisioning engine 102 works to provide a user interface to receive setup information for an organization that is performed before an event is sent out to users over the specified communication channels. The setup can include the management of a top level environment, white-labelling, configuring rules that define or limit which sender can or cannot send to which group of recipients, what numbers to use as a contact method, and add managed recipients and managed contact records.

Event templates are managed within the provisioning engine 102. All events are generated from an "event template," which is a predefined event (including messaging to be delivered to recipients) that includes recipient information. After a request to a specified endpoint is made with a list of recipients (managed or ad-hoc), the event template being used will be instantiated, the data will be placed into the template and the event will then be passed for processing to the event processing engine 104. The event processing engine 104 transforms the event to a resolved event as explained below.

Event Processing

Events are created and managed via event templates created via the provisioning engine 102, and are then processed via the event processing engine 104. In some examples, a mix and match of two types of recipients, such as ad-hoc recipients or managed recipients, are provided in the event templates.

Event processing may include a resolution operation to collect a list of recipients associated with the respective event, in which all recipients are copied from a managed store, any ad-hoc recipient data is added to the list of recipients, and the complete set of recipients is written into a resolved event database. In some implementations, this data does not reference any data in the managed recipient databases and may be implemented as a separate or shared datastore(s).

Resolved events are created, managed and processed by the event processing engine 104. Resolved event recipients may be copied over from an event template. Resolved events may include complete recipient records with an ordered list of notification modalities and historic information as to how each recipient appeared in the event (e.g., appeared in an ad-hoc list, or previously included in dynamic groups 1, 2, and 3).

In related embodiments, resolved events may pass through a process of de-duplication at the event resolver de-duplicator engine 108. During de-duplication, any repeated recipient contact methods in the event are all resolved, meaning the process removes duplicates and resolves the recipients' contact methods in the event. This fully resolved list of recipients can be queried to provide confirmation data in a graphical user interface (GUI), for example, to ask "Are you sure you wish to call 500,000 recipients in the middle of the night?"

Resolved events may be cancelled before or after being actuated. The event resolver de-duplicator engine 108 provides an efficient way to attenuate all outbound activity of a cancelled event immediately, even when mode handlers still receive messages to send after the cancel has occurred due to latency in the topic channels or elsewhere along the chain of message propagation within the system.

It should be understood resolved events may not be deleted immediately, and can be scheduled for deletion based on a time-based policy defined at the tenant level. Accordingly, a delete operation places an event into a state for future deletion based on the tenant policy.

Figure 3:
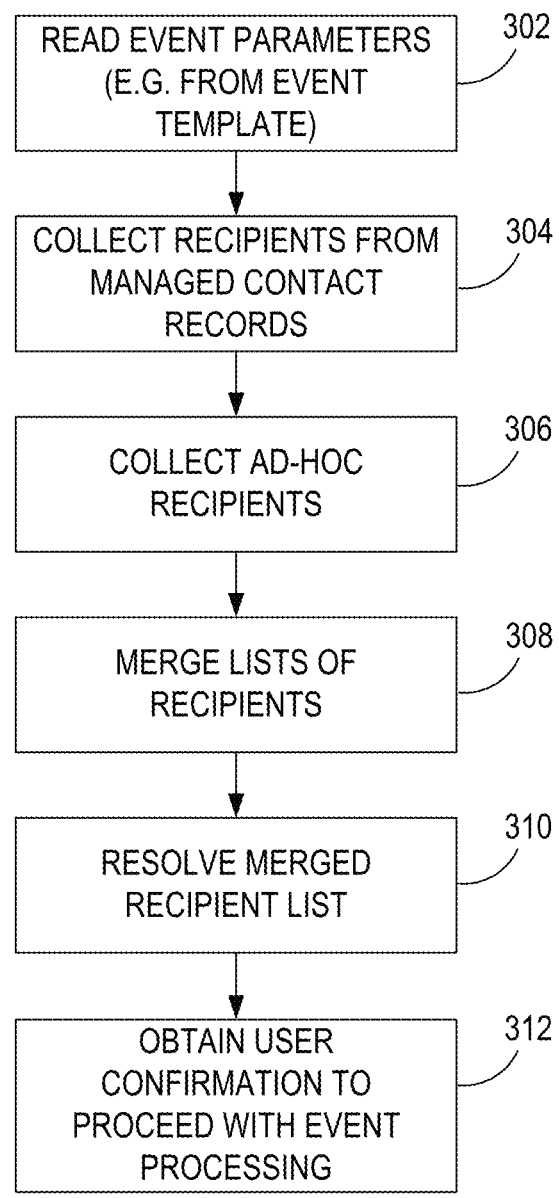
FIG. 3 is a flow diagram illustrating an example event-resolving process that may be carried out by an event processing engine of the system of FIG. 1 according to some embodiments.

FIG. 3 is a flow diagram illustrating an example event-resolving process that may be carried out by the event processing engine 104 according to some embodiments. At 302, event processing engine 104 reads event parameters, such as from an event template, which may identify recipients associated with the event, or may identify groups of recipients. At 304, the event processing engine 104 collects recipients from the managed contact records in accordance with the identified recipients or groups. At 306, the event processing engine 104 collects ad-hoc recipients as provided by the user for the event. At 308, the event processing engine 104 merges the gathered lists of recipients from the various sources.

At 310, the event processing engine 104 calls the de-duplication engine 108 to resolve the merged recipient list. Resolution may include de-duplication of recipients or contact methods (e.g., in case a contact method such as a phone number, email address, or other is listed multiple times as for different recipients—which may in fact be the same recipient but differently identified in those multiple instances).

At 312, the event processing engine 104 obtains confirmation from the user to proceed with execution of the event notifications. The confirmation may be requested by providing an impact assessment (e.g., number of recipients, time of day (or night), estimated duration of event processing, estimated cost of event execution) that is communicated to the user via the user interface 101.

Figure 4:
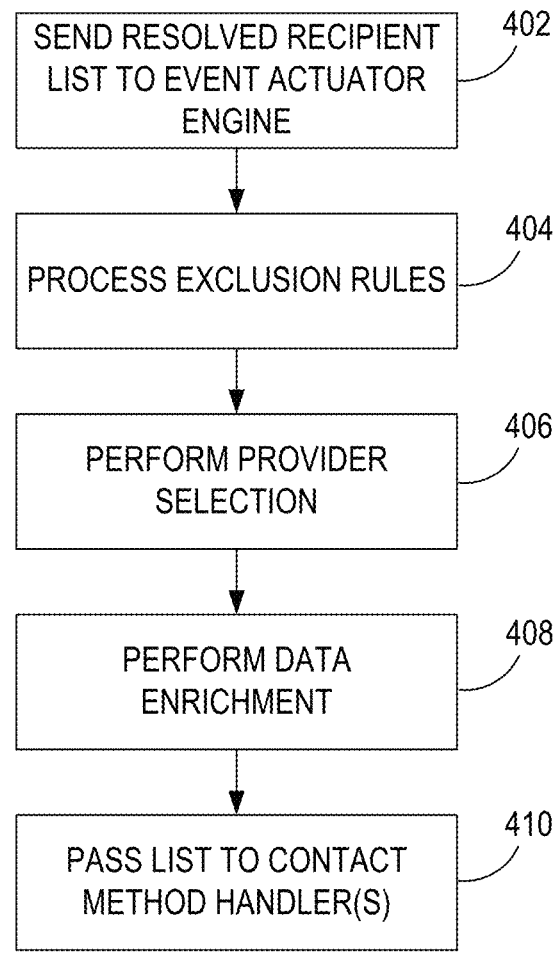
FIG. 4 is a flow diagram illustrating an example process, which may be carried out by the event processing engine, for advancing an event with a resolved recipient list that reaches an "in progress" stage, according to some embodiments.

FIG. 4 is a flow diagram illustrating an example process, which may be carried out by the event processing engine 104, for advancing an event with a resolved recipient list that reaches an "in progress" stage according to some embodiments. At 402, the associated resolved recipients are sent into the event actuator engine 110 via a message bus, queue, or other suitable communications mechanism. At 404-408, the list of recipients is passed to various operational units, including blacklisting (i.e., processing of exclusion rules) at 404, performing provider selection based on selection criteria at 406, and performing data enrichment at 408 (i.e., populate any un-filled data fields in cases where, for example, the recipient data is not yet geo-coded or the phone numbers are not yet identified by an ID service). At 410, the processed recipient list is passed to the contact method handlers 118.

Each of the contact method handlers 118 is an adapter engine that contains specific code to speak with a corresponding provider to handle a particular type of communication. For example, a SMS/Twilio contact method handler may be used to send SMS through the Twilio provider.

During the "in progress" stage, each resolved recipient, complete with all of its mode data and timing data, may be processed by the contact method handlers and external services, e.g., emails are sent to a provider such as Twilio. Notably, contact methods vary in their intrusiveness and cost. Accordingly, in related embodiments, contact methods may be ordered in a hierarchy based on user preferences, recipient preferences, or some combination thereof. For instance, contact methods may be ordered first by recipient preference (e.g., push alert, SMS, email, voice call), and then by cost to the user. Thus, more intrusive or expensive methods may be delayed until a recipient has been provided a chance to respond to a received notification via a more preferred contact method.

Some embodiments address a practical difficulty that may arise in a message based system, namely, the time when the internal message is sent to the contact method handlers 118 is not the correct time to start the contact-method delay because the first contact method may not even get sent in a high volume event before the timeout occurs. Therefore, in such embodiments, contact method stepping takes into account the actual time a message is handed off to the notification provider (if nothing more granular is available) and the contact method handlers test at the very last moment whether they have been backlogged by events and if so, attenuate further contact methods that are already queued or in progress.

Upon receipt of a response from a recipient confirming receipt of a notification, that recipient's data properties are updated accordingly and the recipient may be marked complete with respect to the event. If an error or timeout occurs, the next contact method may proceed to another mode such as scheduling the next operation in the particular recipient's mode tree (e.g., wait 10 minutes after a text to make a voice call).

The Complete stage may include three variations:
Successful—the recipient's data properties are updated with information and re-entered into system.
Cancelled—the recipient's data properties are updated and the execution of the event may be brought to a halt. If the recipient's data properties include a "cancelled" label, that indicates the recipient's data was not sent to the external service.
Error—the recipient's data properties represent an indication of what type of error has occurred.

Each decision made about a recipient and its modes has associated audit information stored such that by the end of a recipient's involvement in an event a complete picture of what happened is provided, e.g., why it was in the event; what modes were involved; what providers were used, why and when; what was the final result of each provider and when; or were any exceptions detected.

When an object is copied into a resolved event and sent through the system, all of these properties are also maintained and provided to each aspect of the system for decision making and for subsequent reporting. The properties represent a snapshot in time of the state of the system when a particular event was sent.

In addition to reporting, the presence of these properties allows a greater level of customization of behavior by the operator or the end user in the future, such as by attaching vetted logic that can execute inside the system and can perform more complex decision making than provided by default.

With reference to the provisioning engine 102 shown in FIG. 1, templates may be created in advance of sending out an event, where the template is pre-stored and includes a message indicating the desire to use placeholders for the event, the groups of people or individuals to whom notifications should be sent, or whether to enable SMS, voice or email capabilities, i.e., rules. These functionalities can be predefined to thus form an event template. Upon reaching the need to send an event, this decision can be performed on an ad-hoc basis, i.e., on the fly. In addition, a template may contain placeholders that can be used to override certain values in messages, such as recipient names or other properties.

In one example in which individuals can be in more than one group, e.g., 20 groups, or can be accidentally included more than once (such as when people are entered into a company's Human Resource system and often all obtain the general company number as their work phone number), a number of challenges may be presented. In this example, it is inefficient, burdensome, and intrusive to send numerous calls to the same number. Accordingly, in some embodiments, when the user wishes to resolve an event, the system may perform an initial resolution operation via the event resolver de-duplicator engine 108. This service removes duplications in the group such that a practical or economical list of unique addresses and people may be obtained.

This resolved list is copied from the provisioning database 120 into the event database 122 of resolved events. In this way, a historical record is created for tracking or auditing purposes. As a result, in cases where the groups or users are removed from the provisioning data it becomes possible to easily determine what happened in the past because a history of what happened is readily available.

After resolving an event by the event resolver de-duplicator engine 108 and storing the obtained data at the event database 122, the system facilitates determining predictive performance information such as the number of messaging recipients that are expected be contacted when an event is sent. Therefore, if the intent is to send information to a small set of users, such as ten users, then the system can provide an indication of the number of users that will be reached. Thus, for instance, when the system provides a notification that 200,000 people will be reached there is an opportunity to refrain from sending information to this many people.

The foregoing process is split into a resolution phase and an actuation phase. Thus, after successfully resolving an event, the event can be actuated by the event actuator engine 110, i.e., to start the event.

The suppression functionality facilitated by the suppression engine 112 provides a way to avoid sending messages to addresses that are either proven to be "bad"—i.e., incorrect or no longer in service, or where the recipients have chosen not to accept messages. For example, if an indication to "stop" an SMS message is provided, then messages will no longer be sent to the recipient entity. For example, in the instance of a "hard bounce" email, if messages are continued to be sent to such hard bouncers then providers used to send email can become displeased. A loss of reputation for sending information can occur here. A hard bounce indicates a permanent reason an email cannot be delivered.

The present disclosure provides a robust system and method for collecting, suppressing, and channeling information and storing the information at the suppression database 114, while at the same time allowing the administrator of a tenant to determine what is suppressed and determine why a user did not receive a specified type of communication. The suppression information may be stored in the suppression database 114 as a suppression list.

When a provider, such as Twilio, is instructed to send an SMS but the number to which the SMS is sent is invalid or an instruction of "Stop" is received in response to the SMS, then this information is provided to the suppression engine 112 and saved in the suppression database in the suppression list. Twilio allows software developers to programmatically make and receive phone calls, send and receive text messages, and perform other communication functions using its web service APIs. Twilio provides a communications platform as a service to customers such as Uber, Netflix, and Airbnb. Twilio utilizes Amazon Web Services (AWS) to power its cloud-scale communication apps globally. AWS is a subsidiary of Amazon providing on-demand cloud computing platforms and APIs to individuals, companies, and governments, on a metered pay-as-you-go basis.

Figure 5:
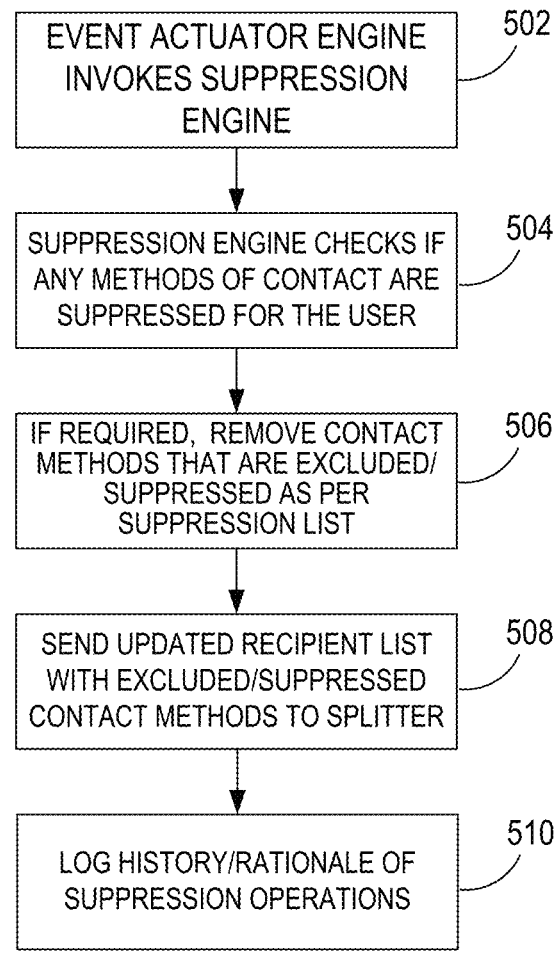
FIG. 5 is a flow diagram illustrating an example process of coordination of event execution, which may be carried out by an event actuator engine, a suppression engine, and a contact method splitter engine of the system of FIG. 1 according to some embodiments.

In related embodiments, after the event actuator engine 110 is initiated, the system facilitates monitoring the process associated with the event. FIG. 5 is a flow diagram illustrating an example process of coordination of event execution, which may be carried out by the event actuator engine 110, the suppression engine 112, and the contact method splitter engine 116 according to some embodiments. At 502, the event actuator engine 110 sends a message to the suppression engine 112 in which it passes the resolved list of recipients to the suppression engine 112 and invokes suppression engine 112 to execute the suppression routine. In the scenario where the message is not sent, then the entire list of recipients to be used for this event is sent to the suppression engine 112. At 504 the suppression engine 112 examines the list of recipients and determines that whether any method(s) of contact should not be sent to a specific recipient because the method(s) of contact is/are suppressed for this user. Consequently, at 506 the suppression engine 112 removes all items that are disallowed by the suppression list, if any. While this occurs, the resolved recipients with suppressed contact methodologies are sent to the contact method splitter engine 116 at 508. Thus, messages travelling on the dotted line extending between the suppression engine 112 and the contact method splitter engine 116 form messages on an event bus. With respect to messages that arrive at the suppression engine 112 including information, such as a name, a list of phone numbers and email addresses, suppressed contact methodologies or recipients will be removed, and the message is forwarded on to the contact method splitter engine 116.

These embodiments recognize that address suppression functionality can be critical to reduce cost and maintain reputation with respect to the various contact method providers. Thus, the system operates to inhibit invalid or manually requested addresses from ever receiving messages. Sometimes organizations are unable to clean their data correctly and people who would rather not receive messages are on their list forever; these circumstances benefit from implementing an ability in the system to suppress contacting the recipient on all addresses after a complaint. Likewise, suppression is beneficial when an address is invalid.

Some related embodiments provide functionality for the service to use during an event and for end users and system operators to be able to figure out why and when an address entered or was removed from the system. Accordingly, at 510, a data model is provided that includes an active set of suppressed contact method addresses, and a historical list of previously suppressed addresses with information on why the address was suppressed and why it was removed from the list and placed into history. Records may be added and removed from this list in at least two ways. First, a create, read, update, and delete (CRUD) API may be provided that allows authorized API users to manage the list. A system administrator may see all entries regardless of tenant, a normal user is bound to only see/modify/add items for their own tenant. An address entry with a NULL tenant is a global entry.

Second, handlers and handler feedback mechanisms (e.g. SES backchannel) may be employed. When an address is determined to be bad, such as an email address receiving a permanent bounce, a record is added to the suppressed address table with a source of SES, and a tenant of whomever created the event that caused the contact channel to be used. Suppressed address records may be kept and not deleted until they are moved to the suppressed address history table with metadata about who and why it is being removed. This will leave an audit trail when determining forensic evaluations of events that typically come in the form of questions about why individuals didn't get a message. FIG. 6 shows program instructions as an example of a technique for leaving an audit trail according to an illustrative embodiment.

When an event is started by the event actuator engine 110, all resolved recipients are first sent to the suppression engine 112 and any contact methods in the record that match entries in the suppression list are removed before it is sent to the splitter engine 116. The status records are updated to indicate that the contact method will not be tried and because it was in the suppression list.

Each type of contact method may have an indication of conditions that would cause an address to be added to the suppression list. For email/SES it may be in the form of an asynchronous feedback system. For SMS it could be that the address was identified as a land line, or the end user requested a STOP, or the address is malformed or otherwise permanently invalid.

In a related embodiment, one of various provider suppression synchronizers 115 receives suppression of data from corresponding one or more providers 128, such as from email systems. Generally, an email provider sends email from more than one person or from a company. As a result, the provider 128 receives suppression data from other providers indicating emails were sent to a bad address. In accordance with one aspect of this disclosure, and for some providers an inspection engine inspects their suppression lists of the providers are inspected and added to the suppression database based on the information provided by the other providers such synchronization of the suppression data is achieved.

The splitter engine 116 examines the contact methods that survived suppression and identifies the destination. For instance, an SMS that should be sent to a provider, such as Twilio, because the SMS is for a U.S.-based recipient, or an email address that should be sent to an email provider, or a voice call to Germany that should be sent to a provider that services Germany for a particular tenant. The contact method splitter engine 116 performs these decisions and sends them off to a contact method handler 118 that can process a specific contact methodology, such as SMS's and a provider such as Twilio. The contact method handler (out) 118A communicates with the providers, such as Twilio, via the API supplied by the respective provider to permit that provider to complete the task of sending out to the particular address. That is, the contact method splitter engine 116 received a resolved recipient from the event resolver de-duplicator engine 108, where a single contact method such as SMS that should be used to send notifications to a particular phone number is associated with the resolved recipient. The contact method splitter engine 116 sends the information associated with the resolved recipient to the contact method handler (out) 118A.

Figure 7:
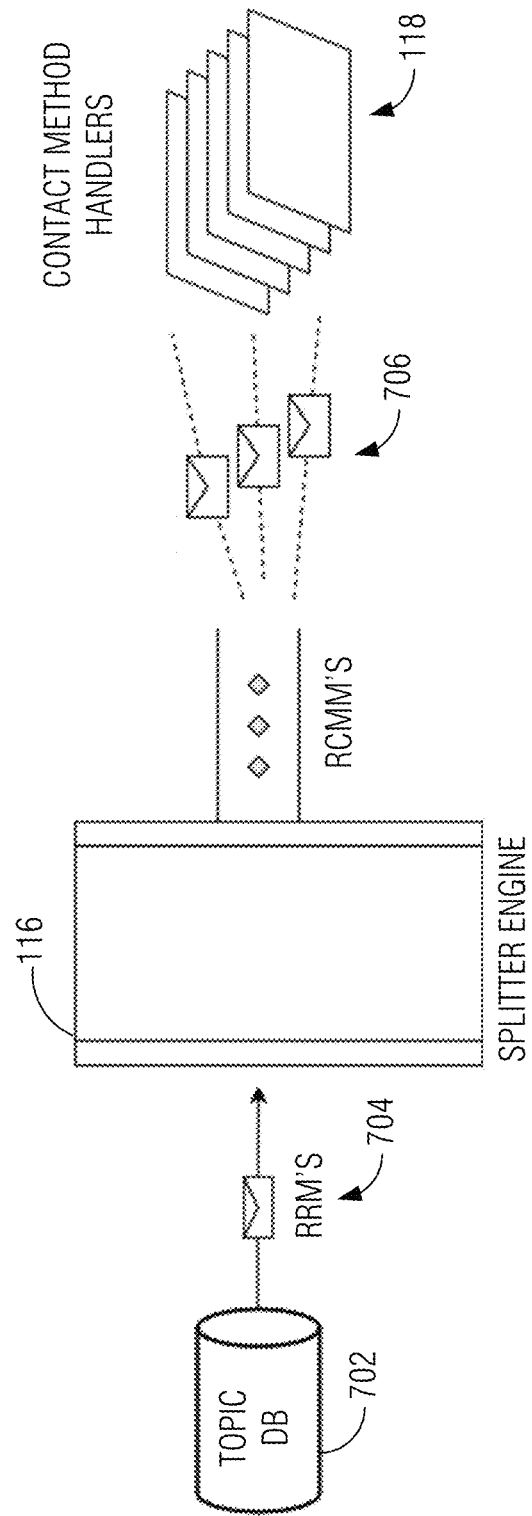
FIG. 7 is a high-level data workflow diagram illustrating operation of a splitter engine of the system of FIG. 1 according to some embodiments.

FIG. 7 is a high-level data workflow diagram illustrating operation of the splitter engine 116 according to an example implementation. As depicted, the splitter engine 116 receives resolved recipient messages (RRMs) from topic channel 702. The RRMs have already been pruned to contain only the resolved recipients, and their respective, already-suppressed, contact methods. The splitter 116 splits each RRM 704 into a plurality of resolved contact method messages (RCMMs) 706. Each RCMM 706 corresponds to one of the acceptable contact methods, and is sent to a corresponding contact method handler 118. Each RCMM may be sent to one, or a subset, of the contact method handlers 118. The splitter 116 may be particularly useful when the various contact method handlers 118 are hosted by different service providers.

Figure 8:
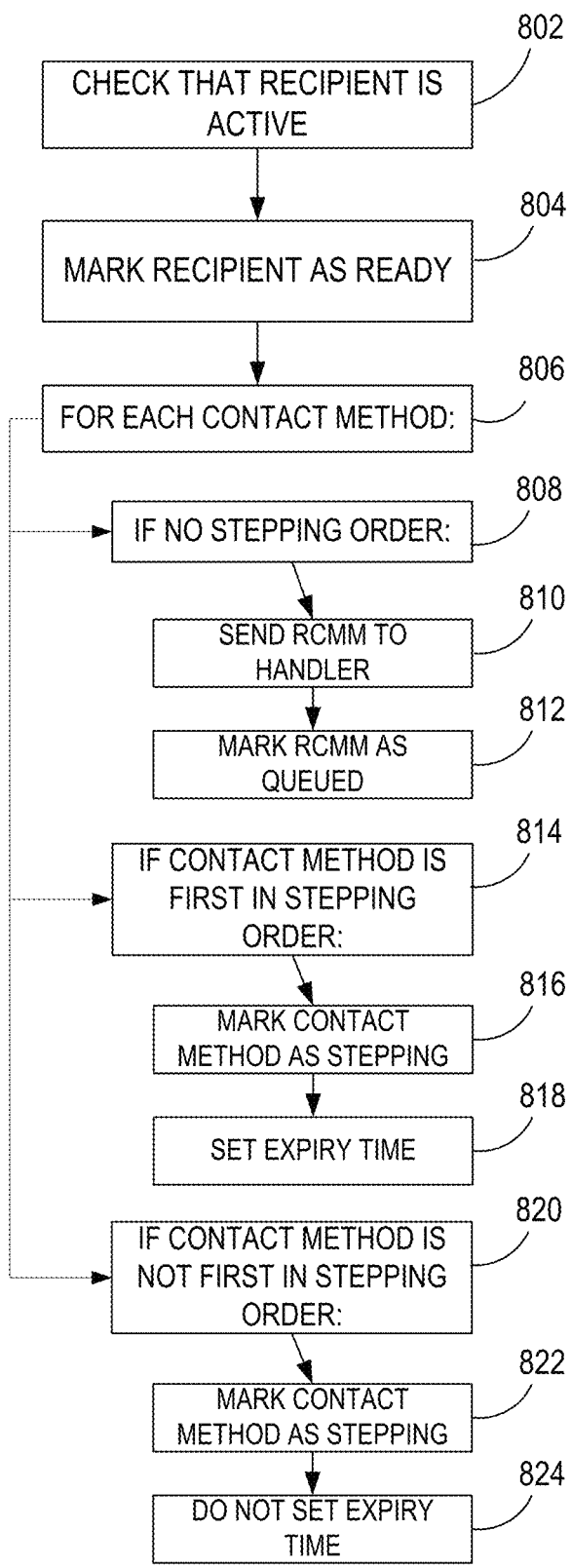
FIG. 8 is a flow diagram illustrating a series operations that may be carried out by the splitter engine according to an embodiment.

FIG. 8 is a flow diagram illustrating a series operations that may be carried out by the splitter engine 116 according to an embodiment to ensure the following parameters are met for each RR and its associated RCMM. At 802, the splitter engine checks that the recipient is active. The recipient should be notifiable and able to receive such notifications. At 804, the splitter engine marks the recipient as "ready." This status may be indicated in short-term cache, for instance.

Operation 806 represents the start of iterative operations that are performed for each contact method. At 808, a determination is made whether there is a stepping order defined. If there is no such stepping order, operations 810-812 are performed, in which the RCMM is passed to the appropriate handler, and that RCMM is indicated as being in a queued state. At 814 a determination is made whether there is a stepping order defined and the contact method in question is the first contact method in that stepping order. Under these conditions, operations 816-818 are performed, in which the contact method is indicated as being in a stepping state, and an expiry time is set to define when the process should step to the next contact method. At 820, a determination is made whether there is a stepping order defined and the contact method in question is not the first contact method in the stepping order. Under these circumstances, operations 822-824 are performed, in which the contact method is indicated as stepping, but an expiry time is not set. This set of operations ensures that the expiry time is set when appropriate, and not prematurely.

Referring again to FIG. 1, the contact method handlers (out) 118A apply one or more rules to check the criteria for the use of each contact method as it may apply to the selected recipient's messaging address, phone number, etc. For instance, one such rule may check the recipient's phone number to determine the geographic association of that phone number (e.g., country code, area code), and to further look up the contact method for that geographic location (e.g., use Twilio SMS in certain countries, use other providers in other countries). Consequently, the splitter engine 116 sends the information associated with the resolved recipient to the Contact method Handler (out) 118A for forwarding to the provider such as Twilio for transmittal of the information via SMS in the corresponding country.

The contact method handler (in) 118B is provided to determine whether communications were effectively established, i.e., whether notifications or messages were correctly received. Thus, when messages are sent, an acknowledged/not acknowledge exchange (ACK/NACK) occurs. In this way, it is possible to determine whether the provider system is in a non-functioning state. For example, in cases of sending a message to a provider, such as Twilio, instructing to the provider to send an SMS to a recipient, the expectation is that an acknowledgement will be received. However, the receipt of such an acknowledgement may not occur immediately. Consequently, the message is inserted into a queue at the provider. At a later point in time, the provider will send an acknowledgement to indicate "yes" the SMS was received by the recipient or the provider will send a not acknowledged to indicate "no" the SMS was not received.

Thus, for each type of provider the contact method handler (in) 118B is used to determine how to interpret or retrieve status about what has happened on the outbound side. In some cases, the contact method handler (in) 118B determines that the status indicates a "hard fail" occurred and that a particular contact method must never be used again. The information associated with the particular status would then be written to the suppression database 114. Otherwise, the contact method handler (in) 118B sends the message to event status database, where the exact determination of what happened can be determined at a subsequent point in time. In some implementations, the contact method handler (in) 118B may also maintain information about the costs of certain events, and sends billing information associated with a billable event to billing data aggregator engine 132.

The contact method handler (in) 118B writes data to the suppression database 114 and, as a result, the contact method handler for each provider will know that if a specific provider responds with a certain set of codes, then this will indicate that a "hard fail" occurred and that the specific methodology of contact should therefore be suppressed to prevent the resending of unwanted or unauthorized messages or notifications. To this end, the contact method handler (in) 118B includes a set of rules for each different provider, which are used to translate the meaning of an error message into whether a hard error or a suppression occurred.

The active event running state cache 126 stores rules associated with each provider 128 of notification services. For example, if a provider 128 has a rule indicating an account must not be allowed to process more than a specific number of outgoing phone calls, n, at a time, then this configuration will be kept in the running state cache for all active events and used by the related contact method handlers (out) 118B. Such a rule could be set so that calls will be limited after an exemplary threshold, e.g., n, is reached. In a related embodiment, the active event running state cache 126 provides tracking of provider rules via the providers 128. In another related embodiment, the active event running state cache also communicates with the contact method splitter engine 116 to determine whether to implement "throttling." In accordance with one aspect of this disclosure, throttling means that the sending of information greater than a number r per minute or more than m messages cannot be in progress at the same time.

In accordance with one aspect of this disclosure, the system and method track the requirement to throttle. Thus, for example, the number of calls in progress, p, is monitored. If the number p is exceeded, then a waiting period is implemented before another call can be sent. Accordingly, when a call is terminated or ends the active event running state cache 126 receives a notification of this event. At this time, it becomes possible to initiate a new call to the relevant provider 128.

Other rules that are stored in the active event running state cache 126 can include certain contact-method stepping rules, that are applicable to define a hierarchy of contact methods, which may be specific to event templates. The hierarchy of contact methods may be stored in a contact method hierarchy database 124, which may be established as part of the provisioning operations.

In some embodiments, the suppression engine 112 may read the contact method hierarchy database 124 to determine an ordering of preference of contact methods in cases where multiple contact methods are available for individual recipients. The suppression engine 112 may work iteratively to suppress those contact methods which are not at the top of the hierarchy. Iterations are processed as events are determined to have failed for the preferred contact methods. Accordingly, in response to a failure indication for an event addressed to a recipient, the next-preferred contact method may be tried. It is desirable to order the ways that recipients are contacted by preference and cost. Ordering contact methods allows delaying more intrusive or expensive methods until a recipient has a chance to respond via a different method.

For example, stepping rules may provide a tenant with the ability to send messages to recipients having a phone number that can receive SMS's and voice calls. Here, the tenant sets the rule to send messages by SMS and wait a period of time, such as 10 minutes. In the case that a recipient does not respond via SMS in 10 minutes, then a voice call to the recipient is initiated.

In a related embodiment, contact-method stepping rules take into account the actual time that a contact method is handed off to the provider (if nothing more granular is available) and the contact method handlers test at the very last moment that they have not been backlogged by events and, if so, they attenuate further methods that are already queued or in progress.

In another related embodiment, attenuation rules are applied to stop contacting a recipient by alternate methods of the hierarchy if that recipient has responded. In one such implementation, an up-to-date (non-queued) status of each recipient is collected, which may be a basic true/false indication of response. This indication may be tested by every contact method at the latest possible moment before actuating a new call to a provider with a subsequent contact method for the respective recipient. In addition, handlers for providers like Twilio where large amounts of messages can be queued up to be sent, the handler checks again when Twilio calls back for further instructions.

In one such implementation, a data store, which may be an in-memory data store such as Redis, includes the fields:
step_trigger_time, which is TIMESTAMP NULLABLE the time this RCM activates when the recipient hasn't responded—initially NULL; and
step_previous_discriminator VARCHAR the previous step, if null then no previous and will be sent immediately.

In addition, a set of database tables, step_ordering, resolved_step_ordering may be implemented with the following fields:
step_ordering_id and resolved_step_ordering_id PK
event_template_id and resolved_event_id FK
step_delay seconds integer NOT NULL DEFAULT 0—the number of seconds to wait for previous step type
step_discriminator VARCHAR NULLABLE type or property to use
step_previous_discriminator VARCHAR NULLABLE type or property to wait for
step_type INTEGER NOT NULL enum or what to use as discriminator—currently a property or a CM type In the provisioning engine 102, delivery order records may use two fields for stepping: a previous step type, and a step delay. If the previous step type is null, it is immediate. If the previous step field holds a contact method type, the meaning is that this contact method type must not be sent until delay happens after the indicated type step has actuated for a particular recipient.

In the contact method splitter, RCM records are created for all types. If the contact method type has a step delay, the state will be STEPPING and the step_trigger_type will be set to the one from the delivery order.

New records may be placed in database with the key Resolvedeventid: resolvedcontactmethodid value 0. "Ack:" may be prepended to this key so that it can be used for additional functions.

A periodic scan may look for RCMMs that are for a RRM that is not yet acknowledged, for an ResolvedEvent that is in progress and not expired and who's step_delay_trigger time is not null and is in the past. If any of those are found, their status is set to QUEUED and messages are added to the queue for the respective contact handler.

In the contact method handler, when a new RCMM is received by the handler, it will be updated in the database with normal statuses for SENDING/SENT but if the type is defined in the EventContactMethodConfig to have a step_delay_type, all RCMMs in state STEPPING with this type will have step_trigger_time set to EventContactMethodConfig.delay+now. The handler 118 checks the database key to be sure that Resolvedeventid:ResolvedRecipientId has the value 0.

When an acknowledge occurs via a backchannel, the database key Resolvedeventid: resolvedcontactmethodid is immediately set to 1 to attenuate any further action on this RRM. The database may be updated as normal.

In a related embodiment, the system is configured to perform multiplexing of events so that other tenants may have their events serviced while some tenants are occupying substantial system resources for large-scale events. The contact method handlers 118 provide access to a matrix of contact method types and providers. Each provider/type combination has a maximum capacity and rate at which it can accept instructions to send based on many factors.

Figure 9:
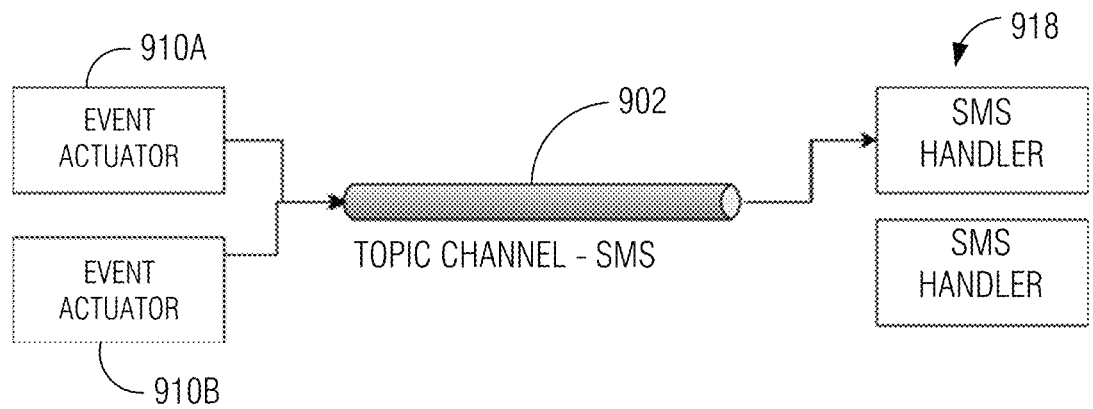
FIGS. 9-10 are diagrams illustrating examples of message passing via a topic channel according to some embodiments.

The system according to embodiments of the present disclosure is a system largely based on message passing via a message broker referred to as a topic channel. FIG. 9 is a diagram illustrating an example of this paradigm according to an embodiment. A topic channel 902 may be implemented as a contact method queue. In the example as illustrated, the topic channel 902 is associated with one or more outbound handlers 918 that facilitates SMS notifications. The topic channel 902 accepts messages from any number of sources, such as event actuators 910A, 910B, and delivers them to at least one of any number of subscribers, such as SMS handlers 918, which listen to the topic channel 902.

The event actuators 910A and 910B may be associated with different tenants of the mass notification system and may have vastly different numbers of message recipients. Accordingly, in such situations, there may be a need to provide sufficient access to the topic channel 902 for one of the event actuators such as event actuator 910B, when another event actuator, such as event actuator 910A is supplying a large number of messages to the topic channel 902.

Figure 10:
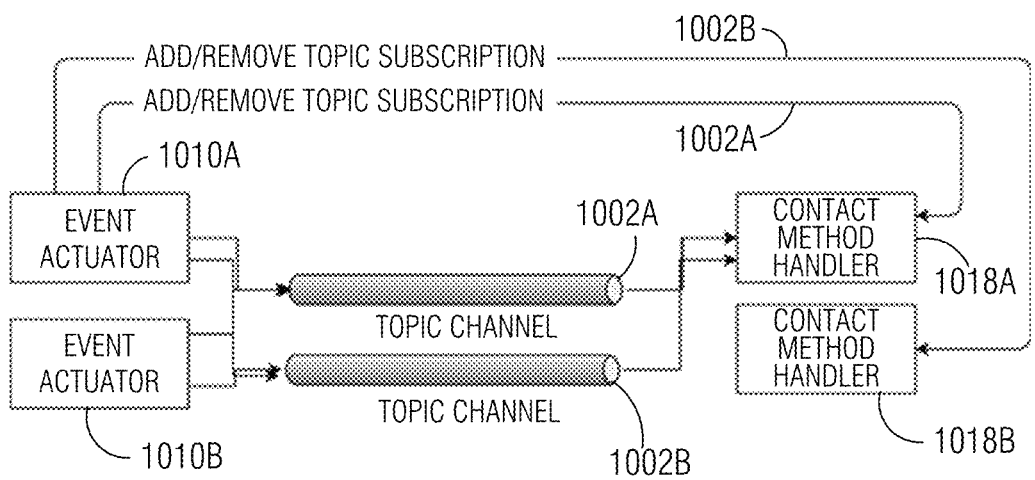

According to a related embodiment, each event in progress is given its own topic channel name, or selects from a pool of available topic channels depending on the capabilities of the underlying messaging bus. If the messaging bus is capable of supporting millions of topics, a topic for each is chosen. When a new topic is created, the handlers that are to subscribe to it are instructed to begin listening to the additional topics. This paradigm is illustrated in FIG. 10. Each of the event actuators 1010A and 1010B may source messages (e.g., RRMs) to one or both topic channels 1002A and 1002B. In addition, each of the event actuators 1010A and 1010B provides a subscription instruction 1002A, 1002B to any one or more of the contact method handlers 1018A and 1018B. Each subscription instruction 1002A, 1002B may instruct the contact method handler 1018A, 1018B to which it is directed to add or remove a topic subscription. Accordingly, the contact method handler 1018A, 1018B listens to the one or more topic channel 1002A, 1002B to which it is subscribed.

Using this paradigm, advantageously, every event actuator has equal access to the handlers (within the batch delivery size used for optimized delivery from the messaging system to the clients) and no single event can monopolize any particular contact method handler.

In a related embodiment, a topic channel includes partitions, in which smaller events, that are below a preconfigured threshold of resolved recipients, may be placed for dedicated to handling of such messages for smaller events. The partitions facilitate spreading out the number of messages on a given topic channel to have events run concurrently without holding up the system or placing all messages on a single topic channel.

When a contact method handler subscribed to a given topic channel that is configured to use partitions notices messages on that topic channel, it will extract those messages from the various partitions of that channel in a predefined sequence, such as cyclically (e.g., in round-robin sequence). The predefined sequence of messages may be supplied by the topic channel itself, and may be adjustable according to some implementations. The use of partitions allows event messages to be inserted into the topic channel to be extracted in an alternate order, allowing more throughput of messages to the corresponding service, as opposed to using a single topic queue with all events in that topic queue in a single sequence.

Figure 11:
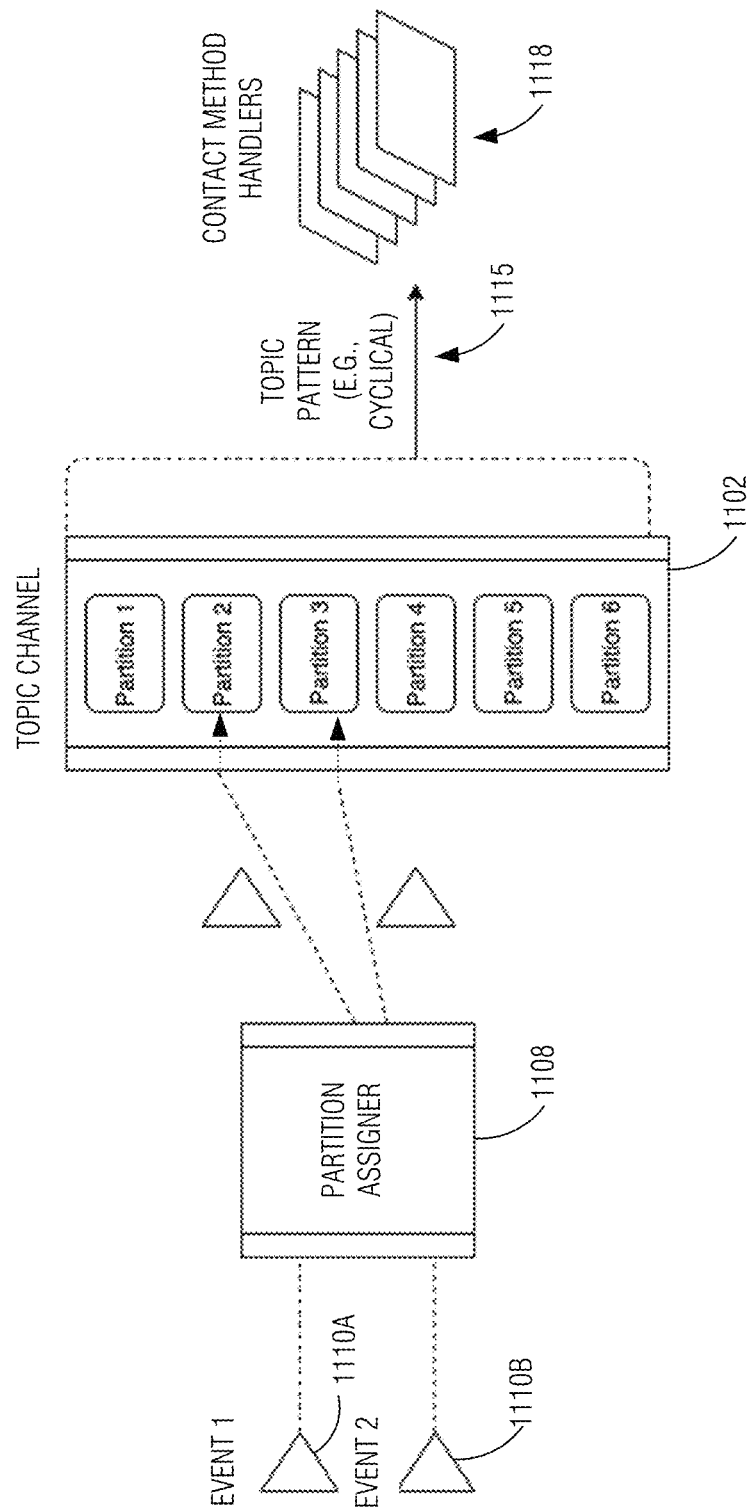
FIGS. 11-12 are diagrams illustrating examples of operational paradigms of a partitioned topic channel according to some embodiments.

FIG. 11 is a diagram illustrating an example operational paradigm of a partitioned topic channel according to an example embodiment. As depicted, the topic channel 1102 includes Partitions 1-6. The partition assigner engine 1108 receives messages (e.g., RRMs) associated with different events, event 1 1110A and event 2 1110B, as may be sourced from respective event actuators. The partition assigner engine 1108 applies criteria for assigning messages to various partitions of topic channel 1102. In the example as shown, messages of event 1 1110A are assigned to Partition 2, whereas the messages of event 2 1110B are assigned to Partition 3. Other assignment criteria may distribute certain events' messages to multiple partitions, such as where those events are particularly large (i.e., have a quantity of recipients exceeding a certain threshold).

The topic channel 1102 may supply the messages to the appropriate contact method handler(s) 1118 according to a topic pattern 1115. One such topic pattern 1115 may be cyclical, as a round-robin pattern ({1, 2, 3, 4, 5, 6, 1, 2, . . . }), for example. In another example, one or more partitions may be prioritized or de-prioritized relative to other partitions. For instance, a topic pattern 1115 may interleave Partition 1 as follows: {1, 2, 1, 3, 1, 4, 1, 5, 1, 6, . . . }. In other examples, a partition may be included in the topic pattern 1115 less frequently (e.g., {1, 2, . . . , 5, 1, 2, . . . , 5, 6, 1, 2, . . . , 5, 1, 2, . . . }).

According to a related such implementation, each event may have the properties fastTrackLimit and maxTopicPartitions. The fastTrackLimit variable may be used at the point of actuating an event to determine whether or not a given event should be placed on a fast track based on the number of resolved recipients for that event. In this context, a fast track is a topic channel that does not have a topic partition suffix at the end of the topic name. The maxTopicPartitions variable may limit the number of partitions to which an event's messages may be distributed.

Figure 12:
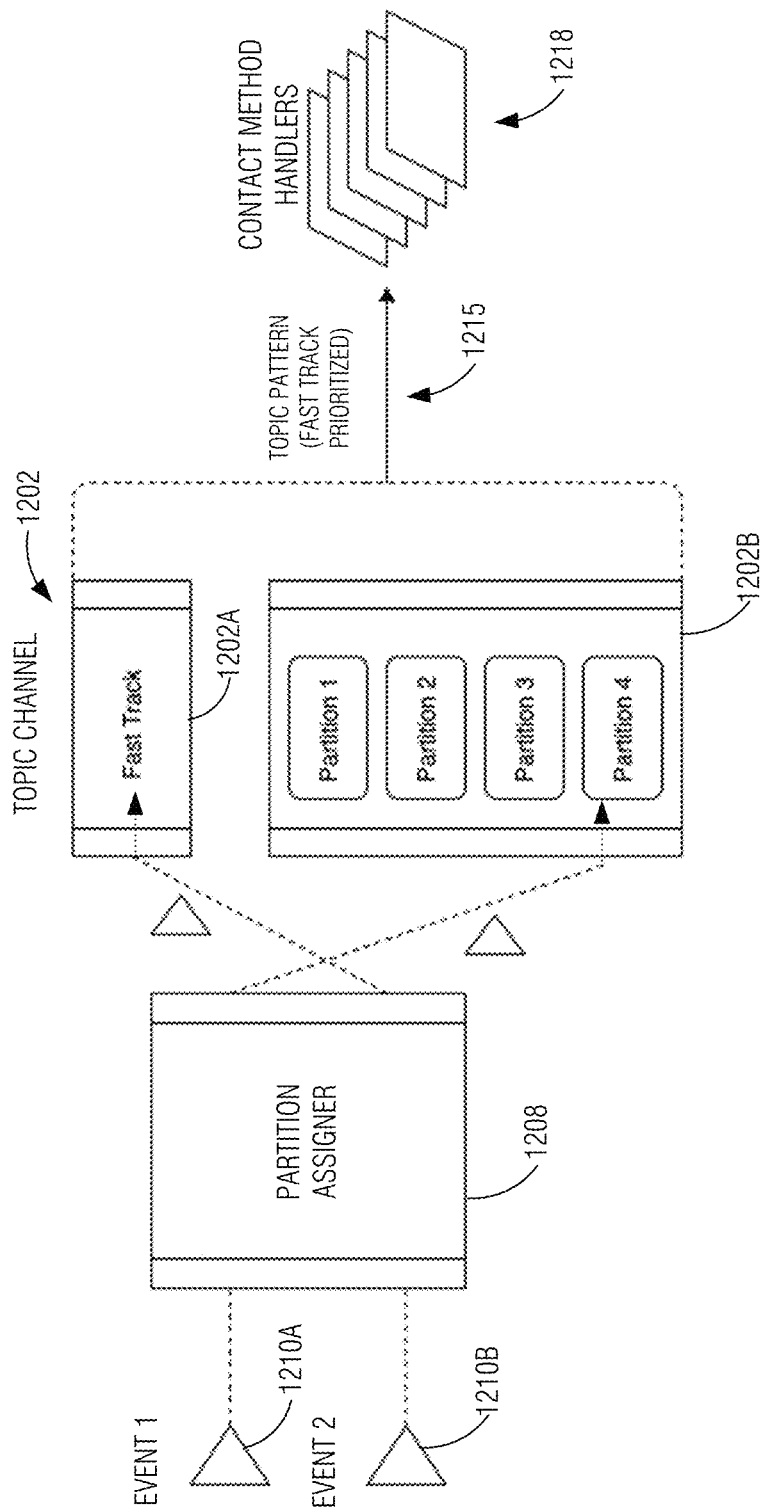

In such embodiments, when an event is actuated and a message is created for that event, if it is not placed on the fast track, the event is placed on a topic partition, which may be defined by the numbered suffix at the end of the topic name. FIG. 12 is a diagram illustrating one such example implementation. The topic channel 1202 in this example has two sections, non-partitioned section 1202A ("fast track"), and partitioned section 1202B. The topic channel 1202 preferentially advances messages arriving to non-partitioned section 1202A to the topic pattern 1215 to achieve the fast tracking. Other messages which are placed in any partitions of partitioned section 1202B are processed cyclically (e.g., round-robin, etc.). Accordingly, the topic pattern 1215 that is passed to the contact method handlers 1218 is prioritized for fast-tracked messages.

Partition assigner engine 1208 uses appropriate criteria to place messages in the fast track section 1202A or into a partition of partitioned section 1202B. For instance, messages from a small event (e.g., 1210B) may be placed in the fast track section 1202A, while a large event (e.g., 1210A) may be assigned to Partition 4 as shown in this example. As another example of assignment criteria, partition assigner engine 1208 may place emergency messages in fast track section 1202A, while placing non-emergency messages in the partitioned section 1202B.

Status API

Referring again to FIG. 1, the status API engine 142 maintains logic associated with the rules as a state of a current event so that a multicast of information can be avoided. The status API engine 142 provides access to the resolved_event recipients and other status data collected/added to such recipients during the lifetime of an event.

When the contact method handler (in) 118A receives a message from a provider 128 indicating that a call is completed, the contact method handler (in) 118A sends a message to the active event running state cache to indicate a new slot for a call has become available. The contact method handler (out) 118B acquires this information so that it becomes known that it is possible to initiate another call. The contact method handler (out) 118B recognizes that it is possible to initiate another call. The contact method handler (out) 118B also sends a notification that is stored in the event status database 144 indicating that it is possible to initiate another call.

Billing Engines

The billing API engine 130, report generator 134, billing database 136 and billing data aggregator 132 provide the ability to bill tenants, i.e., users of the system.

Access Control

In related embodiments, the system facilitates access control. For instance, in one type of implementation, a user to is authenticated to an API of the system when a security token is obtained from a provider, such as the Federated IDP 150, which issues security tokens.

The Federated IDP 150 can be configured to delegate portions of the authentication process to an external directory 154, such as Active Directory, where users type in their user names and passwords and prove their identify, after which the Federated IDP 150 will issue a token that include permission or claims that the API uses to decide what functions the user can perform. The log-in can also be delegated to External Social Sources 152, such as those provided by GOOGLE, FACEBOOK or TWITTER.

The Administrator and API User for a Tenant represent entities that would call API methods. The Administrator configures the token obtained from the Federated IDP to include claims proving that the user used the Federated IDP to obtain the token. The claim, for example, proves the user can communicate with a particular tenant or any particular entity within the system.

Underlying Computing Architecture

Figure 13:
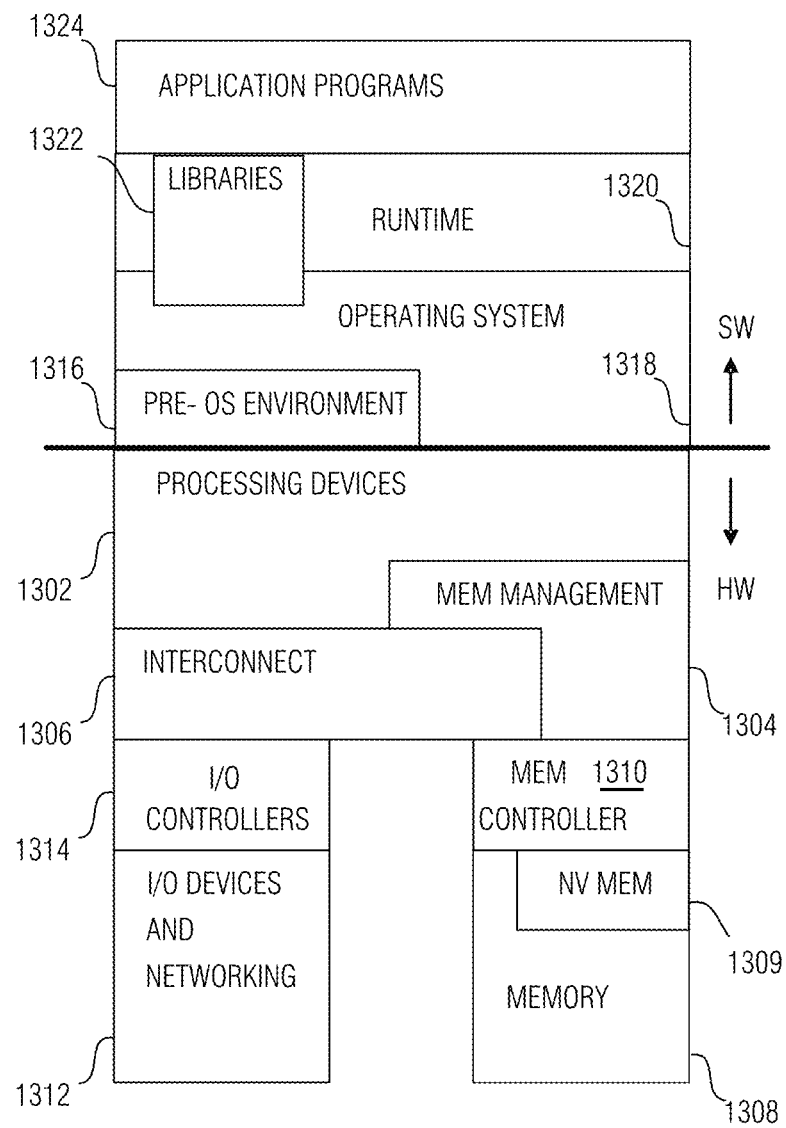
FIG. 13 is a diagram illustrating an exemplary hardware and software architecture of a computer system on which aspects of the embodiments described above may be implemented, and in which various interfaces between hardware components and software components are shown, according to an example.

FIG. 13 is a diagram illustrating an exemplary hardware and software architecture of a computer system on which aspects of the embodiments described above may be implemented, and in which various interfaces between hardware components and software components are shown according to an example. As indicated by HW, hardware components are represented below the divider line, whereas software components denoted by SW reside above the divider line. On the hardware side, processing devices 1302 (which may include one or more microprocessors, digital signal processors, etc., each having one or more processor cores, are interfaced with memory management device 13013 and system interconnect 1306. Memory management device 13013 provides mappings between virtual memory used by processes being executed, and the physical memory. Memory management device 13013 may be an integral part of a central processing unit which also includes the processing devices 1302.

Interconnect 1306 includes a backplane such as memory, data, and control lines, as well as the interface with input/output devices, e.g., PCI, USB, etc. Memory 1308 (e.g., dynamic random access memory—DRAM) and non-volatile memory 1309 such as flash memory (e.g., electrically-erasable read-only memory—EEPROM, NAND Flash, NOR Flash, etc.) are interfaced with memory management device 13013 and interconnect 1306 via memory controller 1310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 1312, which interface with interconnect 1306 via corresponding I/O controllers 13113.

On the software side, a pre-operating system (pre-OS) environment 1316, which is executed at initial system start-up and is responsible for initiating the boot-up of the operating system. One traditional example of pre-OS environment 1316 is a system basic input/output system (BIOS). In present-day systems, a unified extensible firmware interface (UEFI) is implemented. Pre-OS environment 1316 is responsible for initiating the launching of the operating system, but also provides an execution environment for embedded applications according to certain aspects of the invention. Operating system 1318 provides a kernel that controls the hardware devices, manages memory access for programs in memory, coordinates tasks and facilitates multitasking, organizes data to be stored, assigns memory space and other resources, loads program binary code into memory, initiates execution of the application program which then interacts with the user and with hardware devices, and detects and responds to various defined interrupts. Also, operating system 1318 provides device drivers, and a variety of common services such as those that facilitate interfacing with peripherals and networking, that provide abstraction for application programs so that the applications do not need to be responsible for handling the details of such common operations. Operating system 1318 additionally provides a graphical user interface (GUI) that facilitates interaction with the user via peripheral devices such as a monitor, keyboard, mouse, microphone, video camera, touchscreen, and the like.

Runtime system 1320 implements portions of an execution model, including such operations as putting parameters onto the stack before a function call, the behavior of disk input/output (I/O), and parallel execution-related behaviors. Runtime system 1320 may also perform support services such as type checking, debugging, or code generation and optimization.

Libraries 1322 include collections of program functions that provide further abstraction for application programs. These include shared libraries, dynamic linked libraries (DLLs), for example. Libraries 1322 may be integral to the operating system 1318, runtime system 1320, or may be added-on features, or even remotely-hosted. Libraries 1322 define an application program interface (API) through which a variety of function calls may be made by application programs 13213 to invoke the services provided by the operating system 1318. Application programs 13213 are those programs that perform useful tasks for users, beyond the tasks performed by lower-level system programs that coordinate the basis operability of the computer system itself.

Additional Notes and Examples

Example 1 is method for initiating mass notification events in a system, said events comprising bidirectional messaging to a plurality of recipients via different contact methods to provide mass notifications and for receiving acknowledgment status messages, the method comprising: obtaining a security token from a provider to initiate authentication to the system; accessing the system to create intercommunicating entities which receive the bidirectional messages; receiving a request from an entity to send notifications to the plurality of groups of recipients; accessing a suppression database to determine whether any recipient is within the suppression database; transmitting the notifications to the plurality of groups of recipients which are not located within the suppression database.

In Example 2, the subject matter of Example 1 includes, where said accessing the suppression database comprises performing a check to determine whether a recipient provided stop indications for specific modes of communication.

In Example 3, the subject matter of Example 2 includes, wherein the specific modes of communication comprise at least one of SMS messages, phone calls and emails.

In Example 4, the subject matter of Examples 1-3 includes, wherein recipients and email addresses are manually added to the suppression database.

In Example 5, the subject matter of Examples 1-4 includes, storing placeholders for recipients in a provisioning engine, said placeholders encapsulating any setup for an organization including a management of a top level environment, white labelling, configuring who can send to what, and what numbers to use as an address.

In Example 6, the subject matter of Examples 1-5 includes, creating and storing tenants with the provisioning engine, said tenants utilizing the system to send the mass notification to the plurality of groups of users.

In Example 7, the subject matter of Example 6 includes, creating and storing recipients in the provisioning engine, each of said recipients being related to a respective tenant stored within the provisioning engine.

In Example 8, the subject matter of Examples 1-7 includes, wherein the recipients are ad-hoc recipients which are recipients provided through a payload which does not pre-exist within a database, each recipient having an associated list of contact methods including address, country code and associated properties.

In Example 9, the subject matter of Examples 1-8 includes, wherein the recipients comprise managed recipients including details comprising contact method information, location data and personal information, said recipients being saved, removed and edited within the system without being notified.

In Example 10, the subject matter of Examples 5-9 includes, wherein the plurality of recipients is managed and created within the provisioning engine, each of the plurality of groups of recipients having an associated, unique properties and always being associated with an existing tenant.

In Example 11, the subject matter of Examples 1-10 includes, instantiating an alert template after a request to a specified endpoint with a list of recipients; placing data placed into the alert template; transmitting an alert for processing under an event processing engine; and recreating the transmitted alert as a "Resolved Alert".

In Example 12, the subject matter of Example 11 includes, wherein alert templates for generating alerts are managed within the provisioning engine.

In Example 13, the subject matter of Examples 11-12 includes, wherein resolved alerts are passed to an event resolver duplicator service to eliminate duplicates.

In Example 14, the subject matter of Example 13 includes, wherein duplicates comprise repeated recipient records in the alert.

In Example 15, the subject matter of Examples 1-14 includes, wherein the intercommunicating entities comprise at least one of computers, cellphones and smartphones.

Example 16 is an apparatus for initiating mass notification events in a system, said events comprising bidirectional messaging to a plurality of recipients via different contact methods to provide mass notifications and for receiving acknowledgment status messages, the apparatus comprising: a processor; and memory; wherein the processor is configured to: obtain a security token from a provider to initiate authentication to the system; access a system to create intercommunicating entities which receive bidirectional messages; receive a request from an entity to send notification to the plurality of recipients; access a suppression database to determine whether any recipient is within the suppression database; and transmit the notifications to the plurality of recipients which are not located within the suppression database.

In Example 17, the subject matter of Example 16 includes, where said accessing the suppression database comprises performing a check to determine whether a recipient provided stop indications for specific modes of communication.

In Example 18, the subject matter of Example 17 includes, wherein the specific modes of communication comprise at least one of SMS messages, phone calls and emails.

In Example 19, the subject matter of Examples 17-18 includes, wherein recipients and email addresses are manually added to the suppression database. In Example 20, the subject matter of Examples 17-19 includes, wherein the processor is further configured to: store placeholders for recipients in a provisioning engine, said placeholders encapsulating any setup for an organization including a management of a top-level environment, white labelling, configuring who can send to what, what numbers to use as an address.

In Example 17, the subject matter of Examples 17-20 includes, wherein the processor is further configured to: create and store tenants with the provisioning engine, said tenants utilizing the system to send the mass notification to the plurality of groups of users.

In Example 22, the subject matter of Example 21 includes, wherein recipients are created and stored in the provisioning engine, each of said recipients being related to a respective tenant stored within the provisioning engine.

In Example 23, the subject matter of Examples 16-22 includes, wherein the recipients are ad-hoc recipients which are recipients provided through a payload which does not pre-exist within a database, each recipient having an associated list of contact methods including address, country code and associated properties.

In Example 24, the subject matter of Examples 16-23 includes, wherein the recipients comprise managed recipients including details comprising contact method information, location data and personal information, said recipients being saved, removed and edited within the system without being notified.

In Example 25, the subject matter of Examples 20-20 includes, wherein the plurality of recipients is managed and created within the provisioning engine, each of the plurality of recipients having an associated, unique properties and always being associated with an existing tenant.

In Example 26, the subject matter of Examples 16-25 includes, wherein the processor is further configured to: instantiate an alert template after a request to a specified endpoint with a list of recipients; place data into the alert template; transmit an alert for processing under an event processing engine; and recreate the transmitted alert as a "Resolved Alert".

In Example 27, the subject matter of Example 26 includes, wherein alert templates for generating alerts are managed within the provisioning engine. In Example 28, the subject matter of Examples 26-27 includes, wherein resolved alerts are passed to an event resolver duplicator service to eliminate duplicates.

In Example 29, the subject matter of Example 28 includes, wherein duplicates comprise repeated recipient records in the alert.

In Example 30, the subject matter of Examples 17-29 includes, wherein said intercommunicating entities comprise at least one of computers, cellphones and smartphones.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

Example 35 is an automated method for disseminating messages from a first tenant to a plurality of recipients, the method comprising: generating a first event data structure that includes, a first message and a first set of recipients for the first message; placing the first event data structure on a first topic channel data structure of a plurality of topic channel data structures; generating a second event data structure that includes a second message and a second set of recipients for the second message; placing the second event data structure on a second topic channel data structure of the plurality of topic channel data structures; causing a first contact method handler of a set of automated contact method handlers to subscribe to the first topic channel and to the second topic channel; causing a second contact method handler of the set of contact method handlers to subscribe to the second topic channel; by the first contact method handler, reading the first event data structure from the first topic channel, and formatting a first message for transmission to a first mass-communications service provider to notify a first portion of the first set of recipients by a first mode of communication; by the first contact method handler, reading the second event data structure from the second topic channel, and formatting a second message for transmission to the first mass-communications service provider to notify a second portion of the second set of recipients by the first mode of communication; and by the second contact method handler, reading the second event data structure from the second topic channel, and formatting a third message for transmission to a second mass-communications service provider to notify a third portion of the second set of recipients by a second mode of communication that is different from the first mode of communication.

CONCLUSION

The embodiments above are intended to be illustrative and not limiting. In addition, although aspects of the present disclosure have been described with reference to particular embodiments, those skilled in the art will recognize that changes may be made in form and detail without departing from the scope of the invention as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

What is claimed is:

1. An automated system for disseminating messages from a first tenant to a plurality of recipients, the system comprising:
 a processing system including at least one processor and memory; and
 wherein the memory comprises instructions that, when executed, cause the processing system to:
  generate a first event data structure that includes a first message and a first set of recipients for the first message;
  place the first event data structure on a first topic channel of a plurality of topic channels;

generate a second event data structure that includes a second message and a second set of recipients for the second message;
place the second event data structure on a second topic channel of the plurality of topic channels;
cause a first contact method handler of a set of automated contact method handlers to subscribe to the first topic channel and to the second topic channel; and
cause a second contact method handler of the set of contact method handlers to subscribe to the second topic channel;
cause the first contact method handler is to read the first event data structure from the first topic channel, and format a first message for transmission to a first mass-communications service provider to notify a first portion of the first set of recipients by a first mode of communication;
cause the first contact method handler to read the second event data structure from the second topic channel, and format a second message for transmission to the first mass-communications service provider to notify a second portion of the second set of recipients by the first mode of communication;
cause the second contact method handler to read the second event data structure from the second topic channel, and format a third message for transmission to a second mass-communications service provider to notify a third portion of the second set of recipients by a second mode of communication that is different from the first mode of communication;
generate a third event data structure that includes a third message and a third set of recipients for the third message; and
place the third event data structure on the first topic channel;
wherein placement of the first event data structure on the first topic channel includes placement of the first event data structure in a first partition of a plurality of partitions of the first topic channel;
wherein placement of the third event data structure on the first topic channel includes placement of the third event data structure in a second partition of the plurality of partitions of the first topic channel; and
wherein in response to placement of the third event data structure on the first topic channel, the first contact method handler reads the third event data structure in interleaved fashion with the first event data structure.

2. The system of claim 1, wherein the first mode of communication and the second mode of communication comprise different modes of communication from among SMS messages, phone calls and emails.

3. The system of claim 1, wherein the processing system is further operative to:
store placeholders for recipients in a provisioning API, said placeholders encapsulating any setup for an organization including a management of a top-level environment, white labelling, configuring who can send to what, what numbers to use as an address.

4. The system of claim 3, wherein the processing system is further operative to:
create and store tenants with the provisioning API, said tenants utilizing the system to send the firs, second, and third messages.

5. The system of claim 4, wherein recipients of the first, second, and third sets of recipients are created and stored in the provisioning API, each of said recipients being related to a respective tenant stored within the provisioning API.

\* \* \* \* \*

UNITED STATES PATENT AND TRADEMARK OFFICE
CERTIFICATE OF CORRECTION

| | | |
|---|---|---|
| PATENT NO. | : 12,068,877 B2 | |
| APPLICATION NO. | : 17/503114 | |
| DATED | : August 20, 2024 | |
| INVENTOR(S) | : Scott Anderson et al. | |

It is certified that error appears in the above-identified patent and that said Letters Patent is hereby corrected as shown below:

On the Title Page

Item (73) the Assignee, insert as:
INFINITE BLUE IP, LLC, COLLEGEVILLE, PA

Signed and Sealed this
Seventeenth Day of September, 2024

Katherine Kelly Vidal
*Director of the United States Patent and Trademark Office*